United States Patent [19]

Gabriël

[11] Patent Number: 4,596,483

[45] Date of Patent: Jun. 24, 1986

[54] TEMPERATURE RESPONSIVE LINKAGE ELEMENT

[75] Inventor: Dewaegheneire Gabriël, Zwevegem, Belgium

[73] Assignee: Leuven Research and Development, Louvain, Belgium

[21] Appl. No.: 629,416

[22] Filed: Jul. 10, 1984

[30] Foreign Application Priority Data

Jul. 11, 1983 [LU] Luxembourg ............................ 84905
Mar. 21, 1984 [LU] Luxembourg ............................ 85260

[51] Int. Cl.$^4$ ............................... F16B 4/00; F16C 9/00
[52] U.S. Cl. ........................................ 403/28; 403/32; 403/404; 411/909; 169/40
[58] Field of Search .................. 411/909; 403/404, 28, 403/32, 354; 169/40, 38, 39; 24/563, 30.55

[56] References Cited

U.S. PATENT DOCUMENTS

| | | | |
|---|---|---|---|
| 2,396,906 | 3/1946 | Windson | 24/30.55 |
| 3,561,537 | 2/1971 | Dix et al. | 169/38 |
| 3,740,839 | 6/1973 | Otte et al. | 411/909 X |
| 3,783,429 | 1/1974 | Otte | 411/909 X |
| 4,414,716 | 11/1983 | Stastney | 24/563 X |

FOREIGN PATENT DOCUMENTS 2102904  2/1983  United Kingdom ............... 411/909

*Primary Examiner*—Andrew V. Kundrat
*Attorney, Agent, or Firm*—Schwartz, Jeffery, Schwaab, Mack, Blumenthal & Evans

[57] ABSTRACT

A linkage element for releasing a mechanism under influence of temperature, such as a fire extinguishing sprinkler or ventilation shutter. The element must be capable of retaining a maximum bias force, but has also to show a short response time to excessive temperature conditions. The linkage element comprises a pair of coplanar flat jaws, opposite to each other and having a common base. The resistance to flexion in the plane of each jaw is high, whereas the resistance in a plane perpendicular thereto is low. The element further comprises a shape memory alloy, treated for moving the jaws apart from each other in a direction perpendicular to the plane of the jaws when the critical temperature is reached. The element is preferably made in the form of a small thin plate of shape memory alloy.

11 Claims, 12 Drawing Figures

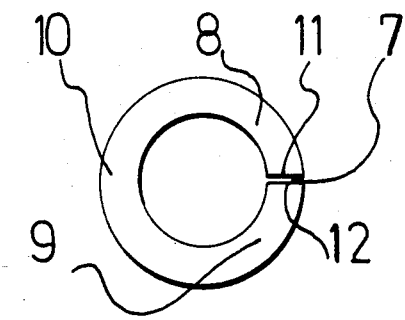
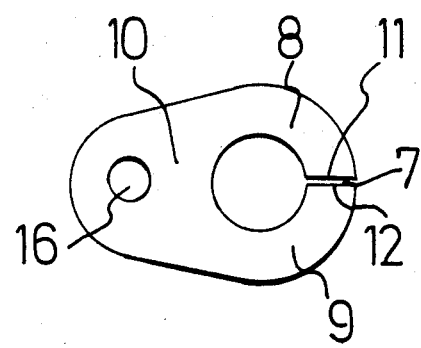
FIG.6    FIG.5
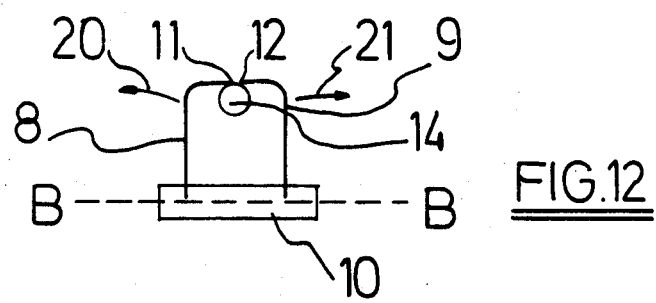
FIG.12
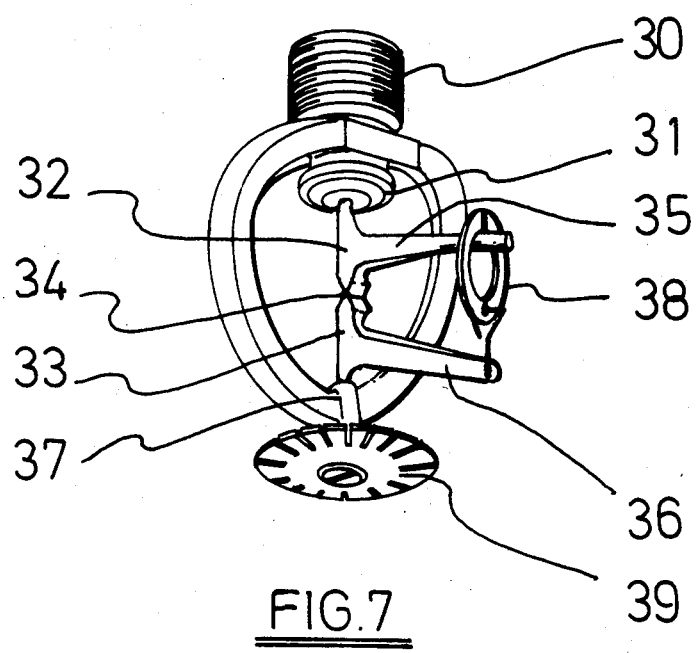
FIG.7

4,596,483

TEMPERATURE RESPONSIVE LINKAGE ELEMENT

BACKGROUND OF THE INVENTION

The invention relates to a temperature-responsive linkage element, and to temperature-responsive linkages operating with such element. Especially in fire protection systems, there are applications where a conduit comprises a valve body which is pushed by a force in the opening or closing sense, but which is kept in the open (in the case of a ventilation tube), or the closed position (in the case of an automatic sprinkler of a possible seat of a fire) because the valve body is retained by a linkage. The latter is, however, designed to give way as soon as the ambient temperature reaches an abnormal level, and the protection system then enters into action, under the influence of the force.

In general, such a linkage connects two bodies (or two parts of the same deformable body) by means of a temperature-responsive linkage element which gives way when it reaches the critical temperature. The presently used linkage elements are, e.g., heat-disintegratable bodies, e.g., by fusion or weakening of which the mechanical resistance strongly decreases or disappears when the critical temperature is reached. In this sense, small sealed bulbs of fragile glass are used. The bulbs are filled with a liquid that evaporates at a critical temperature, so that the receptacle is broken by the expansion of the liquid. Linkage systems in which the releasing movement is procured by a bimetallic strip are also known.

The existing linkage elements, however, experience difficulties in achieving all the necessary or desirable requirements for such elements. The requirement of short response time, essential for fire protection systems, seriously limits the dimension of the heat-sensitive body. This limits the order of magnitude of the forces that the linkage is capable of withstanding and the releasing force that the element is capable of producing. This is contrary to the requirement that these forces should be as high as possible. The use of bimetallic strips presents the difficulty of a rather large necessary strip volume to produce sufficient releasing force, hence a high response time, and such a strip works progressively without having a sharply defined reaction temperature. Fuse alloys show a better defined reaction temperature but, as they stand under normal conditions rather near to the weakening point, the forces acting on the linkage cause the body to flow slowly. Evaporation glass bulbs have a sharply defined reaction temperature, but the response time is high due to the liquid that must be heated, and they are fragile.

SUMMARY OF THE INVENTION

It is the object of the present invention to procure a temperature-responsive linkage element that reconciles much better the above requirements, which can be manufactured in a simple way, and which can serve again after a releasing action.

According to the invention, the linkage element comprises a pair of coplanar flat jaws opposite to each other and having a common base, the resistance moment to flexion in the plane of each jaw being at least tenfold the resistance moment to flexion in a plane perpendicular to the plane of the jaw. The linkage element further comprises a shape memory alloy, treated for moving the jaws apart from each other in a direction substantially perpendicular to the plane of the jaws, when the alloy exceeds its reaction temperature.

As the jaws start from a common base at one side, and, at the other side, are opposite to each other, i.e., turned towards each other, leaving a narrow opening or slit between them, they will have a hook shape. But this must not necessarily be such that the jaws then, such as hooks, can catch any other shape. When this is, however, the case, the linkage element can serve in a first preferred type of linkage, where it catches another hookable body. In a second preferred type of linkage, it clamps two bodies between the jaws, as will be explained below.

The mentioned characteristics of the linkage element enable this element to be used in a way that the forces that the linkage has to withstand act against the high flexion resistance of the jaws in their own plane, whereas the releasing force that the element has to produce occurs in the low flexion resistance plane, perpendicular to the plane of the jaws. In this way, the proportion of the force to withstand, to the releasing force to produce (i.e., the necessary volume of the body or the minimum necessary response time) can be brought to a maximum. In the first type of linkage, for instance, a traction force of 150 N can be retained by a piece of 3 gram.

The above-mentioned preferred first type of linkage, serving to connect two body parts (i.e., two parts of different bodies or of a same deformable body) in a releasable way will be characterized in that it comprises a temperature-responsive linkage element according to the invention, and a hookable body (i.e., hookable by the jaws of the linkage element), fixed to the first body part and caught by the jaws in a position in a plane perpendicular to the plane of the jaws, the linkage element being pivotably fixed to the second body part, the pivoting axis being the intersecting line between both planes.

The above-mentioned preferred second type of linkage, serving to connect two body parts in a releasable way is characterized in that it also comprises a temperature-responsive linkage element according to the invention, both body parts comprising a plate, with both plates being clamped against each other between the jaws of the linkage element.

BRIEF DESCRIPTION OF THE DRAWING

The invention will be explained hereafter with reference to a number of drawings, given only by way of example, and in which:

FIGS. 5 and 6 show other embodiments of the linkage element according to the invention;

FIG. 7 shows such first type of linkage, applied to a fire extinguishing sprinkler;

FIG. 12 shows a schematic view of the essential parts of the linkage element.

DETAILED DESCRIPTION OF PREFERRED EMBODIMENTS

Shape memory alloys are well-known. These are alloys having a martensitic phase at lower temperatures and an austenitic phase at higher temperature (the transformation between both starting at a given temperature, called hereinafter the "reaction temperature"), and being appropriate to produce the shape memory effect. This effect was discovered in the 1950's with certain Cu-Zn, Au-Cd and Ni-Ti alloys, and other such alloys were found later on among the ternary and quaternary alloys of Fe, Ni, Cr, Co or Mn, and which are well-known. In particular, the ternary Cu-Al-Zn alloys with shape memory effect are well-known, the composition of which is represented in a ternary diagram inside a trapezium having the following corner points (expressed in percentages by weight of Cu, Al and Zn respectively: A (64; 1; 35), B (74; 5; 21), C (87.5; 12.5; 0), and D (86; 14; 0).

In order to obtain a desired shape memory effect, the alloy must be treated accordingly, as well-known. For these alloys, it was discovered indeed that, when the alloy has been deformed, in the "cold" or martensitic state, from an initial shape to a second shape, and when the alloy is then heated up into its austenitic phase, the alloy assumes the initial shape again. This means that the alloy, after deformation, has memorized its initial shape. When it returns to its cold state, the alloy again assumes, more or less perfectly, the second shape. The alloy can then be deformed again in the exact second shape, and the alloy, when then heated up towards the austenitic state, will change shape towards the initial shape again. When cooling down again, the return towards the second shape will be more perfect. Accordingly, as the alloy undergoes more cycles of heating up - cooling down - deformation to second shape, as described hereabove, this constitutes the treatment of the alloy.

Figure 1:
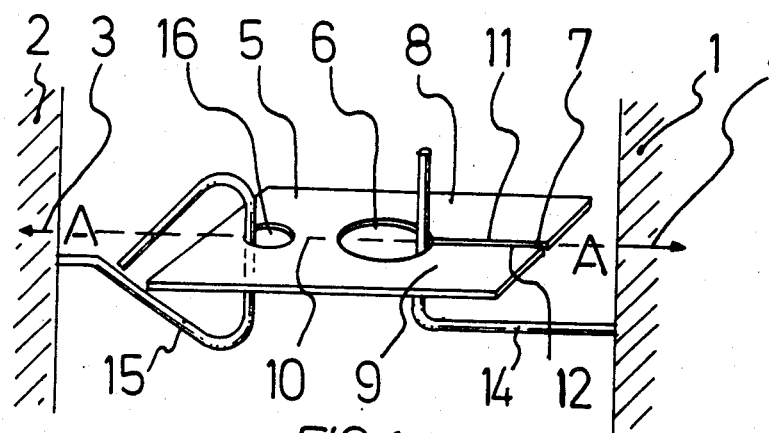
FIG. 1 shows a perspective view of a first preferred type of linkage using a linkage element according to the invention, and in normal position.

FIG. 1 shows a linkage of the first type. Two bodies, schematically indicated by reference numerals 1 and 2, have the tendency to move apart under the influence of the forces 3 and 4. These forces are, however, detained by a linkage element in the form of a small plate 5 having an aperture 6 and a slit 7 connecting the aperture 6 with the external circumference of the plate 5, comprising two coplanar jaws 8 and 9 with common base 10. The plate 5 must not necessarily be rectangular, but can also, e.g., have an oval (FIG. 5) or circular (FIG. 6) shape, the only requirement being that one be able to distinguish, as in the case of FIGS. 1, 5 and 6, in the state of normal room temperature, two coplanar jaws 8 and 9 which have a common base 10 at one side and which are turned towards each other at the other side, leaving a narrow opening or slit 7 between them. The extremities 11 and 12 are consequently opposite to each other and in the proximity of each other, separated by slit 7.

A hookable body 14, in the form of a wire with circular cross-section and bent at a right angle, is connected in a fixed way to body 1, and it enters into opening 6, where it is caught by the plate 5 between the two extremities 11 and 12 of the two jaws 8 and 9, respectively. It is consequently necessary that the thickness of the wire be larger than the width of slit 7.

Figure 2:
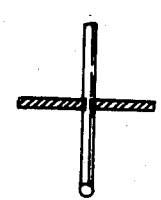
FIG. 2 shows a front view of the same linkage, still in normal position.

Another hookable body 15, also in the form of a wire with circular section, but bent into a triangle in the plane of wire 14, is connected in a fixed way to body 2, and is hooked by the plate 5 by passing through an additional aperture 16 in the plate, where it is also caught by the plate. It is remarked here that this wire 15 can also be made to pass through the opening 6 which comprises the slit, as shown for the round plate in FIG. 6, but an additional aperture 16, in the prolongation of line of slit 7, is preferred (FIGS. 1 and 5) for the mechanical stability of the construction. In this system one can observe that the plate is connected to body 2 in a pivotable way around pivot line AA (FIG. 1). As the whole system is however under tension, the plate 5 will direct itself into a plane perpendicular to the plane of wires 14 and 15. Consequently, in normal position (i.e., at normal temperature), the pivot line AA is the intersecting line of the plane of the plate with the plane of hook 14. This is shown in front view in FIG. 2. The plate in this example has a thickness of 0.5 mm and a surface of about 1 cm$^2$, and serves to resist a tensile force of 50 Newton. Depending on the desired resistance, the thickness will, in general, range between 0.2 mm and 1 mm, and the surface between 0.5 cm$^2$ and 20 cm$^2$.

Figure 3:
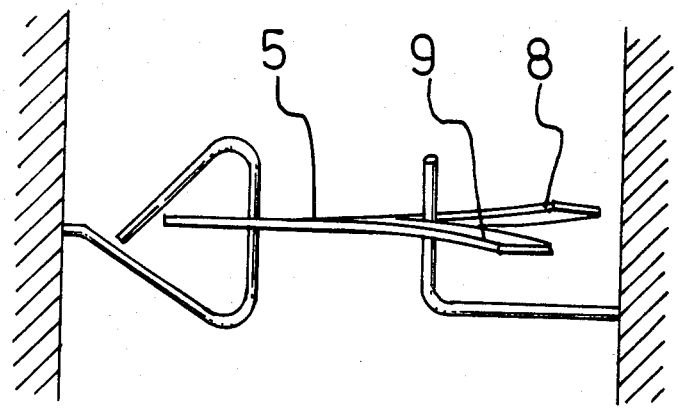
FIG. 3 shows a perspective view of the same linkage, in a pivoted position where the linkage element begins to release.
Figure 4:
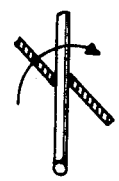
FIG. 4 shows a front view of the linkage, in pivoted position.

The plate is made of a Cu-Zn-Al-alloy No. 1221, this means: 73.7% Cu - 18.9% Zn - 6.4% Al - 0.024% Ti and 0.39% Co, which results in an $A_s$-temperature (starting temperature of the austenitic transformation) of about 68° C. This plate has been treated so as to have both jaws 8 and 9 in coplanar position (FIG. 1) in a martensitic state (below the reaction temperature) and to make one jaw 8 bending upward, and the other jaw 9 bending downward, so that the jaws protrude from the plane of the plate (FIG. 3) when its temperature exceeds the reaction temperature. This will result in pivoting of the plate 5 around axis AA (FIG. 3 and front view of FIG. 4), because of the low bending resistance now and it will release the wire 14. The body 1 is then released from body 2. After cooling-down, the plate returns to its coplanar form, and the wire 14 can then be entered again in the aperture 6 to link the system again.

A particularly practical application of such linkage is shown in FIG. 7, for an automatic fire extinguishing sprinkler. Such a system comprises a threaded tube end 30 for screwing the same into a water pipe under pressure. The outlet of this tube end is obturated by a watertight cover 31, the water pressure tending to push the cover downward. The cover 31 is, however, retained by two levers 32 and 33. The first lever 32 leans, in a pivotable way, on one hand against cover 31, and on the other hand with its fulcrum against a similar fulcrum 34 of the other lever 33. The lever 33 comprises an arm 35. The other lever 33 is similar to the first one, and leans, in a pivotable way, on one hand against a frame 37, fixed at the end of tube 30, and on the other hand against fulcrum 34 of lever 32. The lever 33 also comprises an arm 36. One can see that the arms 35 and 36 have a tendency to move apart under the influence of the water pressure which tends to push the cover 31 downward. These arms 35 and 36 are however kept together by a linkage element 38 of the type described, so that the cover stays in its place as drawn in the figure. In this case, the arm 35 is the hookable body that is caught by the jaws of the linkage element 38.

At the start of a fire in the proximity of this sprinkler, which produces a rise in the temperature of the surrounding atmosphere, the element 38 will release as explained above, and this will result in a water jet, directed towards deflector 39 which will distribute the water in all directions. The deflector 39 is mounted on the frame, opposite the end of the tube 30.

Figure 8:
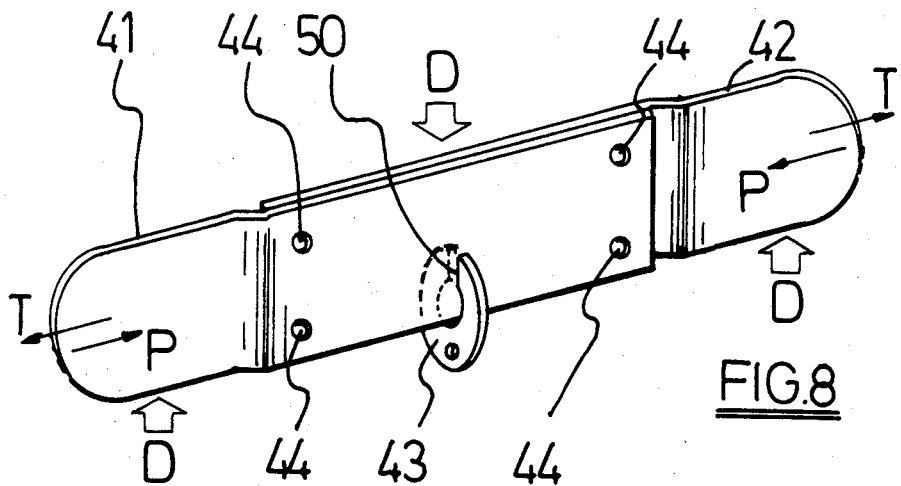
FIG. 8 shows a perspective view of a second preferred type of linkage, using a linkage element according to the invention, and in normal linking position.
Figure 9:
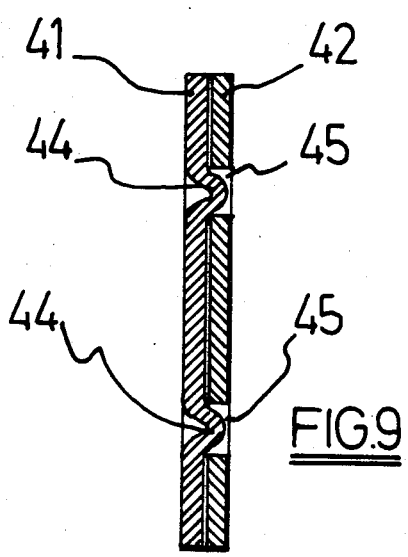
FIG. 9 shows a detailed cross-sectional side view of a part of such second type of linkage.

A second type of linkage, using a linkage element according to the invention, is shown in FIG. 8. Two plates 41 and 42, forming part of a whole linkage system (not shown), are clamped in parallel, the one against the other, by means of a linkage element 43. These plates have the tendency to separate by sliding over each other's surface, under influence of a traction force T, a pressure force P, or a flexion force D. They are, however, retained by a linkage element 43 that clamps both plates together. The correct positioning is guaranteed by the protrusions 44 in the contact surface of plate 41, which fit into the recesses or holes 45. This is shown more in detail in FIG. 9. In such a way both plates 41 and 42 cannot slide over each other, not even slightly, as long as they are clamped between the jaws 47 and 48 (FIG. 10) of the linkage element 43.

Figure 10:
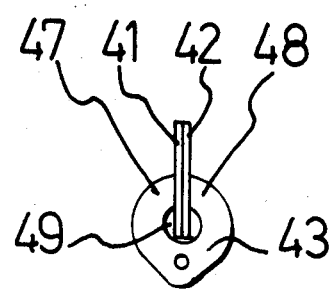
FIG. 10 shows a side view of the linkage, in which the linkage element can be seen in front view.

This linkage element is shown in front view in FIG. 10. It has the form of an oval plate having an aperture 49 connected via a slit with the external circumference of the plate, which need not be oval, but can have any appropriate other form, e.g., rectangular or circular. Both plates 41 and 42 are clamped in the slit 50.

Figure 11:
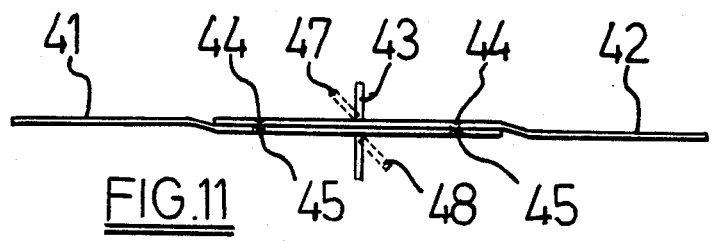
FIG. 11 shows a cross-sectional view of the same linkage, taken in a plane perpendicular to the intersection line of the plane of the linked plates with the plane of the linkage element.

The plate 43 is made of the same alloy and treated in the same way as described above to make jaws 47 and 48 bend, respectively, on one side and on the other side away from the plane of the plate 43 when the latter exceeds the reaction temperature. This will result in pivoting of the plate 43 (FIG. 11 in dotted line) and, the plate will be no longer capable of clamping the plates 41 and 42 together because of the low bending resistance now. At this moment, plate 41 is released from plate 42 and, under influence of the forces T, P or D (FIG. 8), will be able to overcome the last obstacle to sliding apart: the fitting of the protrusions 44 into the recesses 45 in the contact surfaces between both plates 41 and 42. After opening of the linkage and cooling-down, the plate 43 returns to its coplanar form, and both plates 41 and 42 can then be put again together in closed position and clamped between the jaws of the same plate 43 (FIG. 8).

The embodiments of the second type of linkage are not limited to the example above. The two plates 41 and 42 can have only one protrusion 44 fitting with one recess 45, or several such pairs of protrusions and recesses when the sliding is to be initiated under a bending force D. One plate must not necessarily contain all the protrusions and the other one all the recesses. Nor is it necessary that the plates 41 and 42 separate by sliding. This can also occur by a movement perpendicular to the contact surface, in so far as the plates, in the linked state, are clamped between the jaws 47 and 48 of the linkage element. The two bodies that are connected by the linkage must not necessarily have a plate form, in so far as they each comprise a plate in the form that the latter can be superposed on the similar plate of the other part.

For such linkage systems, several linkage element configurations can be designed, based on the same principle and without departing from the idea of the invention. As schematically shown in FIG. 12, two coplanar jaws 8 and 9 are needed, which start at one side from a common base 10, and which are, at the other side, turned towards each other and "near" to each other. This distance between the jaws in normal position at ambient temperature, will depend, e.g., in the case of FIG. 1, on the thickness of the wire 14 which is to be retained by the jaws 8 and 9, and in the case of FIG. 8, on the thickness of the plates 41–42. In general, this distance will range from zero (contact) to a maximum of five times the smallest dimension of the extremities 11 and 12 of the jaws where they border on each other. In the case of plate 5 of FIG. 1, for instance, the smallest dimension of the extremities 11 and 12 of the jaws is the thickness of the plate. The slit 7 will consequently have a width, preferably ranging from zero to a maximum of five times this thickness, but can be larger in certain specific cases. It is, however, necessary that the jaws 8 and 9 be sufficiently resistant against flexion in the plane of the jaws (arrows 20–21 in FIG. 7) in order not to be opened under influence of the mechanical forces which tend to release the two bodies that must be linked together. This is the reason why these jaws 8 and 9, in any embodiment, shall have a resistance moment against flexion in their own plane (arrows 20–21) which is at least tenfold the resistance moment against flexion in a plane perpendicular thereto. This is the case when the jaws form part of a plate as in FIGS. 1, 5 and 6.

The linkage elements according to the invention are temperature sensitive, but the temperature must not necessarily be procured by a temperature rise of the surrounding atmosphere. A remote control of these elements is possible by mounting (e.g., by means of solder) an electric resistance in close heat conducting contact with the shape-memory alloy of the element, the resistance being connected to a voltage supply over a control system which connects the resistance with the supply when the linkage has to enter in action for releasing. By producing sufficient heat dissipation in the resistor, the shape memory alloy will then exceed its reaction temperature. By using a resistor with positive temperature coefficient (a PTC-thermistor), a short heating time can be obtained without leading to overheating of the alloy, because a PTC-thermistor, as well-known, produces less heat as the temperature rises so as to stabilize the temperature.

The linkage element must not necessarily be made completely of a shape memory alloy, although this embodiment is simple and cheap. It will be sufficient that only the part intended for the deformation be made of shape memory alloy, and this part must not necessarily be localized at the extremities of the jaws. One can, for instance, design an element (see FIG. 12), where the jaws 8 and 9 are not deformed, but where the base 10 is treated in order to produce a light twist around axis BB when the reaction temperature is reached. The jaws will then at extremities 11 and 12 where they are adjacent to each other, move apart from each other in a direction perpendicular to the plane of the jaws 8 and 9, which is still inside the principle of the invention. Nor is it necessary that the jaws both produce a deformation; it is sufficient that the part where the jaws are in proximity to each other be moved apart from each other, i.e., that the distance becomes larger, and this can occur by a deformation of a single jaw.

The exact composition of the shape memory alloy will depend on the desired reaction temperature. For Cu-Al-Zn alloys, for instance, it is known that the reaction temperature can be increased by lowering the zinc content and increasing the copper content accordingly, or by lowering the aluminum content and increasing the copper or zinc content accordingly. Two parameters can consequently be varied in order to obtain the desired reaction temperature, as well-known. For instance, in order to obtain a lower reaction temperature than for the above-mentioned No. 1221 alloy ($A_s = 68°$ C.), the alloy No. 1168 can be used: 74.4% Cu - 17% Zn - 7.55% Al ($A_s = 65°$ C.). For safety applications against overheating conditions, this reaction temperature shall range between 30° C. and 150° C. For fire protection systems, this value shall preferably be chosen between 55° C. and 85° C.

The alloy and its treatment can also be such, that the linkage element is bent to the unlocking shape, not when the temperature exceeds a limit (e.g., 70° C.) in the upward sense, but also when it exceeds or crosses a limit value (e.g., $-50°$ C.) in the downward sense. The invention is consequently not limited to temperature-responsive elements with a reaction temperature above ambient room temperature, but also may be responsive to reaction temperatures below ambient room temperature. For a butane or propane supply valve towards a tank, for instance, when the liquid in the tank reaches a level at which the supply flow must be stopped, a small quantity of the liquid is made to escape in a way that its evaporation and rapid expansion transforms it into a cold gas jet directed to such temperature sensitive linkage which releases the supply valve so that the latter can close under influence of a spring or other pressure.

With respect to the reaction temperature of the alloy, the latter starts its transformation towards austenite at a temperature $A_s$, and finishes same at a temperature $A_f$, and the return towards the martensite phase in the opposite sense starts at a temperature $M_s$ and finishes at a temperature $M_f$. As well-known, these four temperatures lie sometimes in a rather broad range of 20° to 50° difference. For the alloys, however, where the reaction occurs above normal ambient temperatures (40° C. and more), or below ($-30°$ C. and lower), it is clear that the system will respond at the temperature $A_s$ or $M_s$, respectively. These temperatures are consequently to be considered respectively as the "reaction temperatures" of the alloy.

The invention is not limited to the examples given hereinabove. Other embodiments and equivalents can be designed without departing from the principles of the invention as explained above. In particular, the wording such as "coplanar" and "perpendicular" are not to be considered in this strict geometrical and abstract sense, but more in the sense of about coplanar or perpendicular.

I claim:

1. Temperature responsive linkage element, characterized in that it comprises a pair of coplanar flat jaws opposite to each other and having a common base, the resistance moment to flexion in the plane of each jaw being at least tenfold the resistance moment to flexion in a plane perpendicular to the plane of the jaw, and that it comprises a shape memory alloy, treated for moving said jaws apart from each other in a direction substantially perpendicular to the plane of the jaws, when the alloy exceeds its reaction temperature.

2. Temperature responsive linkage element according to claim 1, characterized in that both jaws with their common base are in the form of a perforated plate, having an aperture connected via a slit to the external circumference of the plate, the latter being made of a shape memory alloy.

3. Temperature responsive linkage element according to claim 1 characterized in that said shape memory alloy is a Cu-Al-Zn alloy.

4. Temperature responsive linkage element according to claim 1 characterized in that the shape memory alloy has a reaction temperature ranging between 30° C. and 150° C.

5. Temperature responsive linkage element according to claim 1 characterized in that it comprises an electric resistance element in heat-conducting contact with said shape-memory alloy.

6. Temperature responsive linkage element according to claim 5, characterized in that said electric resistance element is a positive temperature coefficient thermistor.

7. Linkage for connecting two body parts in an unlinked way under influence of temperature, characterized in that it comprises a temperature responsive linkage element according to claim 1 and a hookable body, fixed to the first body part and caught by the jaws in a position in a plane perpendicular to the plane of the jaws, the linkage element being pivotably fixed to the second body part, the pivoting axis being the intersecting line of both planes.

8. Linkage according to claim 7, characterized in that said hookable body is in the form of a wire with circular cross-section.

9. Linkage according to claim 7 characterized in that the linkage element is caught by another hookable body traversing an opening in said linkage element and having a smaller cross-section than the cross-section of said opening, said other hookable body being fixed to the second body part and said linkage element being pivotable with respect to said other hookable body.

10. Linkage for connecting two body parts in an unlinked way under influence of temperature, characterized in that it comprises a temperature responsive linkage element according to claim 1 both body parts comprising each a plate, both plates being clamped in parallel against each other between the jaws of said linkage element.

11. Linkage according to claim 10, characterized in that the contact surface of the first, respectively second one of said plates comprises at least one protrusion, respectively recess, the protrusion fitting in the recess, the linkage being adapted for opening by the sliding of one contact surface with respect to the other one.

* * * * *

UNITED STATES PATENT AND TRADEMARK OFFICE
CERTIFICATE OF CORRECTION

PATENT NO. : 4,596,483

DATED : Jun. 24, 1986

INVENTOR(S) : Gabriël DEWAEGHENEIRE

It is certified that error appears in the above-identified patent and that said Letters Patent is hereby corrected as shown below:

TITLE PAGE:

[75] Inventor: Gabriël DEWAEGHENEIRE

Signed and Sealed this

Fourth Day of November, 1986

[SEAL]

Attest:

DONALD J. QUIGG

*Attesting Officer*  *Commissioner of Patents and Trademarks*